(12) United States Patent
Miyahara et al.

(10) Patent No.: US 7,779,376 B2
(45) Date of Patent: Aug. 17, 2010

(54) OPERATION ANALYSIS METHOD OF SEMICONDUCTOR INTEGRATED CIRCUIT

(75) Inventors: Shingo Miyahara, Osaka (JP); Kenji Shimazaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 11/907,166

(22) Filed: Oct. 10, 2007

(65) Prior Publication Data
US 2008/0092090 A1 Apr. 17, 2008

(30) Foreign Application Priority Data
Oct. 11, 2006 (JP) .............................. 2006-277355
Jul. 9, 2007 (JP) .............................. 2007-179329

(51) Int. Cl.
*G06F 17/50* (2006.01)

(52) U.S. Cl. ............................................. 716/4; 716/5

(58) Field of Classification Search .................. 716/4, 716/5
See application file for complete search history.

(56) References Cited

U.S. PATENT DOCUMENTS 5,057,704 A * 10/1991 Koyanagi et al. ........... 327/534
7,039,536 B2 5/2006 Nagata et al.
2006/0017481 A1* 1/2006 Yoshikawa ................... 327/170
2006/0091550 A1* 5/2006 Shimazaki et al. ........... 257/758

FOREIGN PATENT DOCUMENTS

| JP | 11-126827 | 5/1999 |
|---|---|---|
| JP | 2005-4245 | 1/2005 |
| JP | 2005-4268 | 1/2005 |

* cited by examiner

*Primary Examiner*—Vuthe Siek
(74) *Attorney, Agent, or Firm*—McDermott Will & Emery LLP

(57) ABSTRACT

Operation analysis is performed for a semiconductor integrated circuit designed by using substrate bias control technology. Power supply potential and substrate potential are analyzed by using circuit information of the semiconductor integrated circuit, and from obtained power supply potential waveform information and substrate potential waveform information, potential difference information indicating a difference value between the power supply potential and the substrate potential is obtained. On the basis of this potential difference information, effects on circuit delay due to substrate noise are analyzed using a delay library showing a relationship between the difference value and the effects on circuit delay. Further, a determination is performed as to whether the difference value exceeds a predetermined difference restriction value.

30 Claims, 14 Drawing Sheets

FIG. 8

| Signal | State transition 1 |
|---|---|
| A | 0→1 |
| B | 1 |
| NY | 1→0 |
| Y | 0→1 |
| Delay | Delay(A→NY) × Rising coefficient × Δ (VDD-Nwell Potential) +Delay(NY→Y) × Falling coefficient × Δ (VDD-Pwell Potential) |

| Signal | State transition 2 |
|---|---|
| A | 1 |
| B | 0→1 |
| NY | 1→0 |
| Y | 0→1 |
| Delay | Delay(B→NY) × Rising coefficient × Δ (VDD-Nwell Potential) +Delay(NY→Y) × Falling coefficient × Δ (VDD-Pwell Potential) |

| Signal | State transition 3 |
|---|---|
| A | 1 |
| B | 1→0 |
| NY | 0→1 |
| Y | 1→0 |
| Delay | Delay(A→NY) × Falling coefficient × Δ (VDD-Nwell Potential) +Delay(NY→Y) × Falling coefficient × Δ (VDD-Pwell Potential) |

| Signal | State transition 4 |
|---|---|
| A | 1→0 |
| B | 1 |
| NY | 0→1 |
| Y | 1→0 |
| Delay | Delay(B→NY) × Falling coefficient × Δ (VDD-Nwell Potential) +Delay(NY→Y) × Falling coefficient × Δ (VDD-Pwell Potential) |

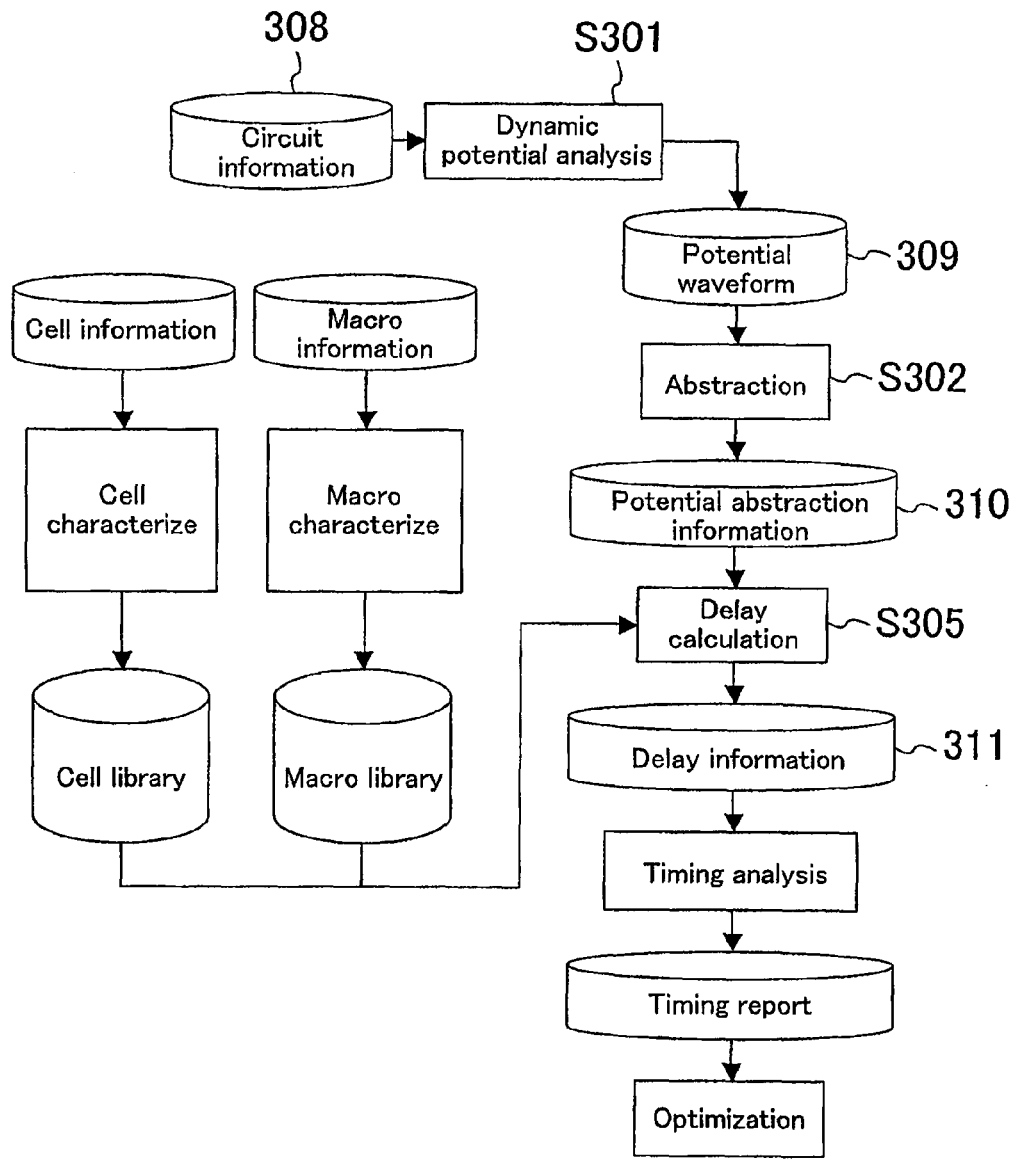
FIG. 19 *Prior Art*

FIG. 20 *Prior Art*
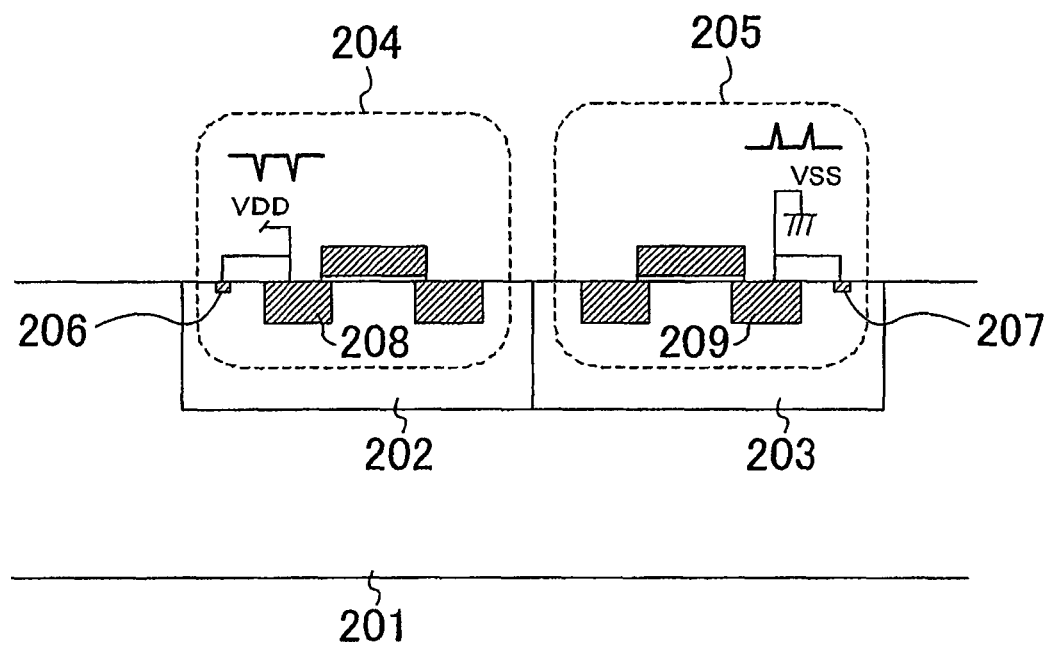

OPERATION ANALYSIS METHOD OF SEMICONDUCTOR INTEGRATED CIRCUIT

This non-provisional application claims priority based on Patent Application Nos. 2006-277355 filed in Japan on Oct. 11, 2006, and 2007-179329 filed in Japan on Jul. 9, 2007, the entire contents of which are hereby incorporated by reference.

BACKGROUND OF THE INVENTION

1. Field of the Invention

The present invention relates to an operation analysis method of a semiconductor integrated circuit, particularly a large scale and high speed drive LSI (Large Scale Integration).

2. Related Background Art

While multiple-function and low power consumption appliances have dominated the market in recent years, their components, LSIs, are also required to consume less power. As one of the lower power consumption design techniques used for such LSIs, substrate bias control technology is proposed (Patent document 1).

FIG. 18 shows an example of the substrate bias control technology in the CMOS design using a silicon substrate. A deep N well 210 is formed on a P-type silicon substrate 201, and further inside thereof, an N well 202 and a P well 203 are formed. In the N well 202, a P-channel transistor 204 and an N well substrate contact 206 are formed. In the P well 203, an N-channel transistor 205 and a P well substrate contact 207 are formed. The substrate contacts 206 and 207 are respectively connected to dedicated control wirings VBP and VBN. That is, such a configuration is provided that controls substrate potential with independent wiring from power supply wiring VDD and ground wiring VSS respectively connected to transistor sources 208 and 209.

For example, a case of performing substrate bias control regarding the P-channel transistor 204 will be described. When a potential lower than the power supply wiring VDD is provided to the control wiring VBP, electric charge in the channel is depleted, so that although a transistor operating speed becomes slow, power consumption due to leak current and the like decreases. Conversely, when a potential higher than the power supply wiring VDD is provided to the control wiring VBP, power consumption increases but the transistor operating speed becomes fast. Likewise, when a potential higher than the power supply wiring VSS is provided to the control wiring VBN, electric charge in the channel is depleted, so that the transistor operating speed becomes slow while reducing power consumption due to leak current and the like. Conversely, when a potential lower than the power supply wiring VSS is provided to the control wiring VBN, power consumption increases but the transistor operating speed becomes fast.

Thus, the substrate bias control technique is characterized in that by controlling the substrate potential at the N well and P well by control wiring which is independent of the power supply wiring VDD and the ground wiring VSS, priority of transistor operating speed and power consumption during operation of the LSI is controlled, and power consumption can be reduced depending on the speed required.

On the other hand, because of the demand for multiple functionality, a number of circuit elements are mounted on one LSI by LSI microfabrication technology. As a result, the total amount of current consumed by the circuit elements increases, while on the other hand an operating frequency of the circuit elements is rising, thereby posing conspicuous problems of power supply noise and substrate noise of the LSI. In view of this, there are proposed methods of predicting the power supply noise and the substrate noise from LSI design information (see Patent Document 2 and Patent Document 3).

As the way the power supply noise and the substrate noise affect LSI, there is the conspicuous problem of affecting delay time of a digital circuit element, in addition to effects on conversion accuracy of an analog/digital converter, PLL jitter, and the like. Consequently, there is proposed a method of predicting the delay time based on the waveform of the power supply noise (see Patent Document 2).

FIG. 19 shows a conventional example of the method. A dynamic potential analysis S301 is performed by using circuit information 308 such as a net list, layout information, parasitic resistance, and parasitic capacity. Based on a resultant potential waveform 309 thus obtained, through an abstracting step S302 which abstracts the potential, a delay calculation S305 is performed by using calculated potential abstracting information 310, thereby calculating delay information 311.

(Patent Document 1) Japanese Unexamined Patent Publication No. 11-126827

(Patent Document 2) Japanese Unexamined Patent Publication No. 2005-4268

(Patent Document 3) Japanese Unexamined Patent Publication No. 2005-4245

In the foregoing delay calculation technique that take the potential waveform into consideration, as shown in FIG. 20, it is assumed that the power supply VDD and the N well substrate contact 206 are connected and that the ground VSS and the P well substrate contact 207 are connected. In this case, since the potentials of the power supply and ground are the same as the substrate potential, it was possible to predict malfunction of a circuit such in delay time by using the power supply potential and the ground potential.

However, as mentioned above, in the semiconductor integrated circuit using the substrate bias control technology, because the power supply potential and the ground potential are different from the substrate potential, the substrate potential fluctuates differently depending on the operating status of the circuit elements. Therefore, it is not possible to predict the circuit malfunction from the power supply potential and the ground potential alone. That is, differently from the conventional design where the power supply is connected to the substrate, the power supply noise and the substrate noise become independent of each other in the substrate bias control design, so that it is also necessary to take into consideration effects on circuit delay due to the substrate noise.

SUMMARY OF THE INVENTION

It is an object of the present invention to provide an operation analysis method which makes it possible to predict malfunction with higher accuracy than in prior art regarding a semiconductor integrated circuit designed by using the substrate bias control technology.

That is, a method of performing an operation analysis for a semiconductor integrated circuit designed by using substrate bias control technology includes: a power supply potential analysis step of analyzing a power supply potential by using circuit information of the semiconductor integrated circuit and obtaining a power supply potential waveform of each circuit element; a substrate potential analysis step of analyzing a substrate potential by using the circuit information and obtaining a substrate potential waveform of each circuit element; and a difference calculation step performing a difference calculation for each circuit element by using the power supply potential waveform and the substrate potential waveform and obtaining potential difference information indicating a difference value between the power supply potential and the substrate potential. The operation analysis of the semiconductor integrated circuit is performed by using the potential difference information.

According to the present invention, in the power supply potential analysis step, the power supply potential waveform at each circuit element is obtained, while at the same time in the substrate potential analysis step, the substrate potential waveform at each circuit element is to be obtained. Thus, malfunction of a circuit can be predicted by taking into consideration mutual effects of the power supply potential waveform and the substrate potential waveform. Further, in the difference calculation step, potential difference information indicating the difference value between the power supply potential and the substrate potential is obtained for each circuit element. Thus, from this potential difference information, it is possible to predict the effects on the circuit elements such as threshold fluctuation and delay fluctuation with higher accuracy than in the prior art.

Further, in the difference calculation step, it is preferable that a maximum value of differences between the power supply potential and the substrate potential at each time is set as the difference value. This enables a potential difference between the power supply potential and the substrate potential in the worst condition to be easily obtained.

Further, in the difference calculation step, it is preferable that a larger value of a difference between the maximum value of the power supply potential and a minimum value of the substrate potential, and a difference between the maximum value of the substrate potential and the minimum value of the power supply potential, is set as the difference value. This eliminates the need for the simultaneous analysis of the power supply potential and the substrate potential, and enables the potential difference to be predicted at the worst condition such as when the power supply potential waveform and the substrate potential waveform are out of alignment in the time axis.

Further, in the difference calculation step, it is preferable that a difference value between a mean of the power supply potential and a mean of the substrate potential is set as the difference value. This makes it possible to obtain potential difference information effective for delay calculation when it is difficult for the waveform shape itself to affect the malfunction of the circuit elements such as especially when the operating frequency of the semiconductor circuit is fast.

Further, it is preferable that the operation analysis method of the semiconductor integrated circuit according to the present invention includes a circuit operation effect calculation step of obtaining effects on the circuit operation from the potential difference information. This makes it possible to predict details of effects on the circuit elements such as the threshold fluctuation and the delay fluctuation from the potential difference information.

In addition, it is preferable that the circuit operation effect calculation step further includes a step of determining whether the difference value indicated by the potential difference information exceeds a predetermined difference restriction value. This makes it possible to confirm that the difference value between the power supply potential and the substrate potential falls within the difference restriction value to which the threshold fluctuation and the like is added.

Further, it is preferable that the circuit operation effect calculation step further includes a step of obtaining a fluctuation amount of a threshold from the difference value indicated by the potential difference information. This makes it possible to predict the details of effects on the threshold fluctuation from the difference value between the power supply potential and the substrate potential.

Further, it is preferable that the circuit operation effect calculation step further includes a step of obtaining a fluctuation amount of jitter from the difference value indicated by the potential difference information. This makes it possible to predict the details of effects on jitter fluctuation from the difference value between the power supply potential and the substrate potential.

Still further, it is preferable that the circuit operation effect calculation step further includes a step of obtaining a fluctuation amount of accuracy of an analog/digital conversion circuit or a digital/analog conversion circuit from the difference value indicated by the potential difference information This makes it possible to predict the details of effects on the fluctuating amount of accuracy of the analog/digital conversion circuit or the digital/analog conversion circuit from the difference value between the power supply potential and the substrate potential.

Furthermore, it is preferable that the circuit operation effect calculation step further includes a step of obtaining delay by using the difference value indicated by the potential difference information and by referring to a delay library showing a relationship between the differential value and the delay. This makes it possible to rapidly predict details of effects on delay fluctuation by referring to the preset delay library from the difference value between the power supply potential and the substrate potential, and thus it is possible to accurately predict delay in the case where the power supply fluctuation and the substrate fluctuation are different in the substrate bias control circuit.

Moreover, it is preferable that the delay library has information in which between the difference value, applied potential of the power supply, and applied potential of the substrate are related to the delay. This makes it possible to deal with the case where the extent of effects of delay on the difference value between the power supply potential and the substrate potential varies greatly with the voltage conditions of the power supply and the substrate.

Further, it is preferable that the delay library has information in which between the difference value, applied potentials of the power supply and the ground, and applied potential of the substrate are related to the delay. This makes it possible to deal with the case where the ground potential is not necessarily a zero potential such as at the time of forward bias.

Further, it is preferable that the delay library has information in which the difference value, a difference between applied potentials of the power supply and the ground, and a difference between applied potentials of the N well substrate and the P well substrate are related to the delay. This makes it possible to reduce the number of necessary conditions as the library by treating everything in terms of relative voltage difference.

Further, it is preferable that the delay library has information on a relationship between the difference value, and a rising delay value, and a falling delay value. This makes it possible to predict details of effects on the accurate delay fluctuation according to transistor operating conditions by taking into consideration independently effects of the potential difference between the N well substrate and the power supply upon the rising delay and effects of the potential difference between the P well substrate and the ground upon the falling delay.

Further, it is preferable that the operation analysis method of the semiconductor integrated circuit according to the present invention includes an optimization step of modifying the circuit information from calculation results of the circuit operation effect calculation step so as to reduce noise. This makes it possible to reduce noise by modifying parts that affect noise with analyzed noise as the reference.

Further, it is preferable that the optimization step has at least one of: a step of adjusting the number and intervals of substrate contacts; a step of adjusting wiring widths of power supply wiring and substrate wiring, together with adjusting mesh wiring intervals; a step of adjusting the number and quantities of decoupling capacities among the power supply wiring, ground wiring, and the substrate wiring; a step of adjusting kinds of packages, lengths of wires, and values of capacities; a step of adjusting an arrangement of cells having high activation rates which affect noise; and a step of adjusting the substrate potential and an amount of current to be put into the substrate.

Further, it is preferable that the operation analysis method according to the present invention includes a modification step of performing modification that takes manufacturing variation into consideration for at least one of a resistance value and a capacity value in the circuit information, and that the power supply potential analysis step and the substrate potential analysis step perform analysis by using, in lieu of the circuit information, the circuit information after the modification by the modification step. Moreover, it is preferable that the modification step performs a modification that takes transistor variation into consideration. Alternatively, it is preferable that the modification step performs a modification that takes wiring variation into consideration. This makes it possible to predict malfunction of the circuit in consideration of the manufacturing variation, because the circuit information to be used for analysis can be made very close to what is actually manufactured through modification in consideration of transistor variation and the wiring variation.

Further, it is preferable that the difference calculation step obtains, for each region in the semiconductor integrated circuit, the potential difference information for each circuit element belonging to the region, and adopts information having a maximum absolute value, among the obtained potential difference information as the potential difference information in the region. Still further, it is preferable that the operation analysis method according to the present invention further includes a delay calculation step of obtaining, from the potential difference information for each region, delay value distribution information in the semiconductor integrated circuit. This makes it possible to estimate proper potential difference information corresponding to the circuit position, making it possible to more accurately analyze effects on circuit delay.

As described above, according to the present invention, by obtaining the difference value of the power supply potential and the substrate potential in the semiconductor integrated circuit which is designed by using the substrate bias control technology, it is possible to predict malfunction of a circuit due to a potential difference, especially to analyze the effects on the circuit delay. Further, by preparing the relationship between the difference value and effects on the circuit delay per circuit element as a library, it is possible to accurately analyze effects of the potential difference on the circuit delay. Furthermore, a restriction value of the difference value is created as the library, and by comparing this with the difference value, it is possible to confirm whether the difference value is within an accepted range. Moreover, circuit optimization can be attained to minimize noise effects.

BRIEF DESCRIPTION OF THE DRAWINGS

FIG. 8 is a diagram showing an example of calculating a relationship between a potential difference and delay.

FIG. 19 is a diagram showing an example of a conventional timing analysis method.

FIG. 20 is a diagram showing a configuration of a MOS transistor assumed by a conventional method.

DESCRIPTION OF THE PREFERRED EMBODIMENTS

With reference to the drawings, the embodiments of the present invention will hereinafter be described in detail. In this specification, the term of "potential" means "voltage."

Figure 1:
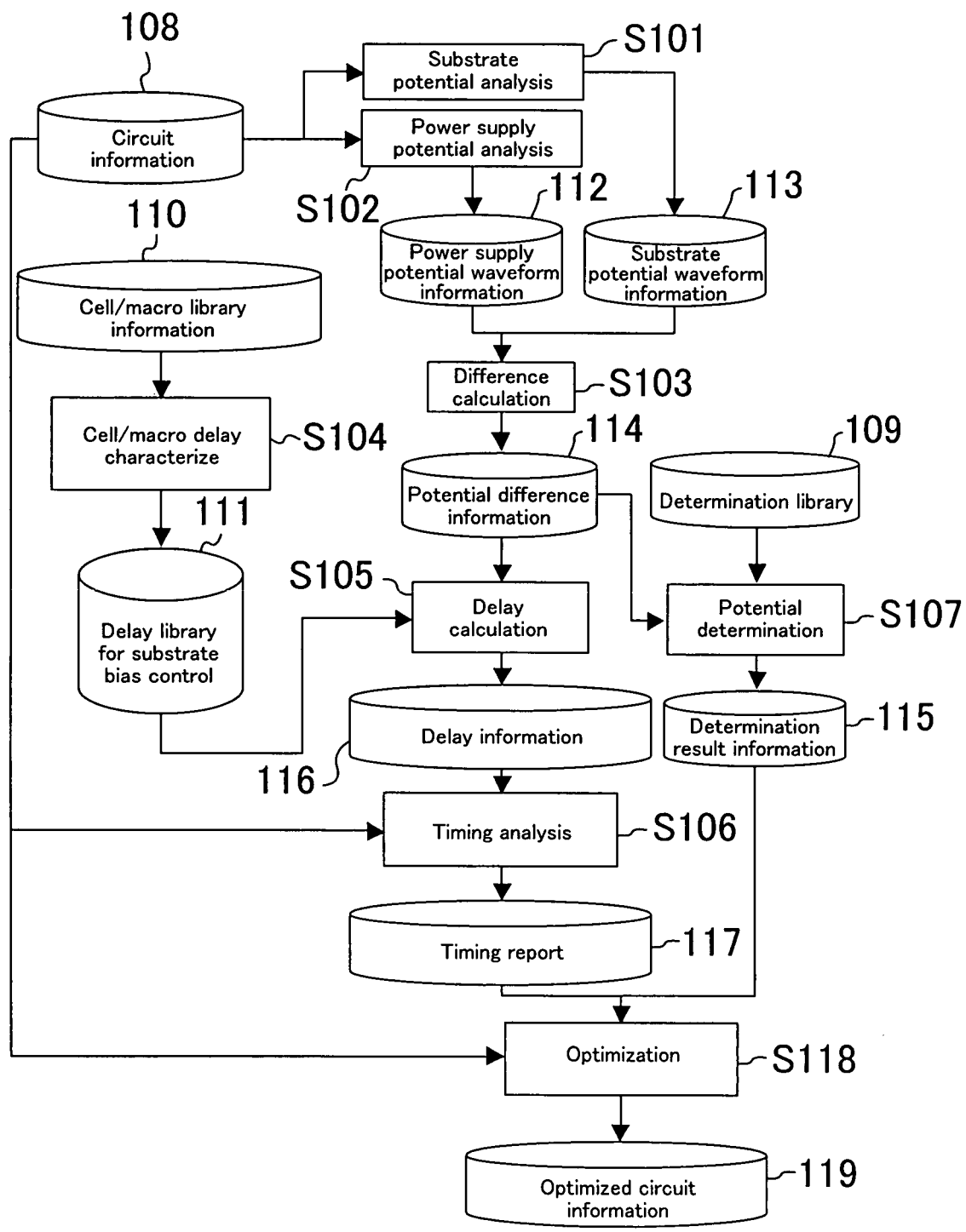
FIG. 1 is a diagram showing an operation analysis method of a semiconductor integrated circuit according to an embodiment of the present invention.
Figure 2:
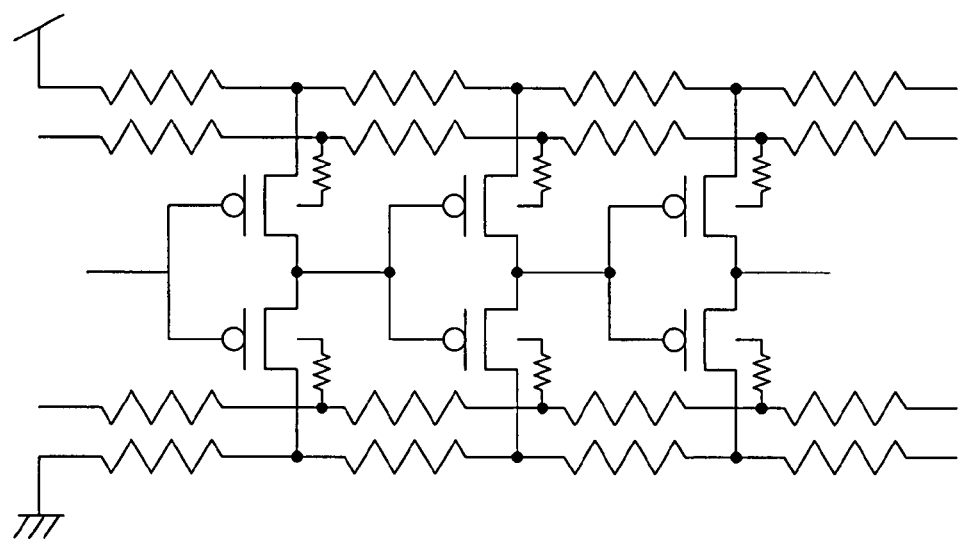
FIG. 2 is a diagram showing an example of net list information in circuit information.

FIG. 1 is a diagram showing an operation analysis method of a semiconductor integrated circuit according to one embodiment of the present invention. In FIG. 1, circuit information 108 describes a semiconductor integrated circuit designed by using a substrate bias control design. The circuit information 108 includes, for example, net list information indicating a connection relationship of circuit elements as shown in FIG. 2, layout information indicating arrangement information on LSI of circuit elements and wiring information such as power supply and signal wiring, and technology information having resistance density such as power supply wiring resistance and substrate resistance.

A substrate potential analysis step S101 reads the circuit information 108 and analyzes substrate potential by using this circuit information 108, thereby obtaining a substrate potential waveform in each circuit element and outputting it as substrate potential waveform information 113. Specifically, from the net list information contained in the circuit information 108, electric current waveforms running on the substrates of individual circuit elements and electric current waveforms running on substrate contacts are obtained, and a potential fluctuation waveform on the substrate of each circuit element (below a circuit element channel and the like) is calculated on the basis of the layout information included in the circuit information 108 and the substrate resistance obtained from the technology information. It should be noted that as regards the calculation method of this potential fluctuation waveform, there are various methods including prior art examples, hence, such methods may be used.

A power supply potential analysis step S102 reads the circuit information 108 and analyzes power supply potential by using this circuit information 108, thereby obtaining a power supply potential waveform in each circuit element and outputting it as power supply potential waveform information 112. Specifically, from the net list information contained in the circuit information 108, consumption electric current waveforms of individual circuit elements are obtained, and a potential fluctuation waveform on the power supply and the ground of each circuit element is calculated on the basis of the layout information included in the circuit information 108 and the power supply resistance obtained from the technology information. It should be noted that as regards the calculation method of this potential fluctuation waveform, there are various methods including prior art examples, hence, they may be used.

Figure 3:
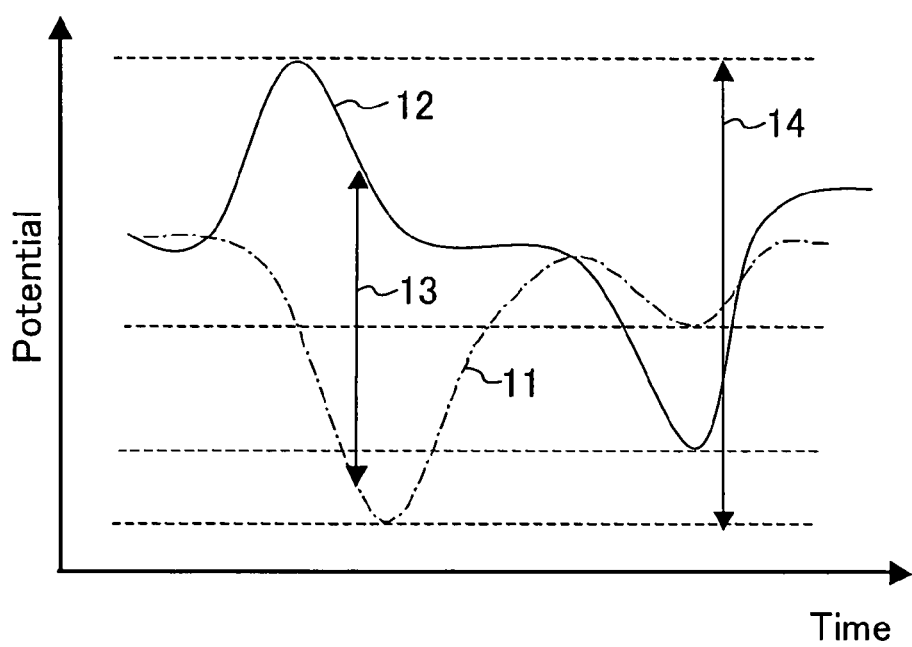
FIG. 3 is a diagram explaining a method of calculating a difference value between power supply potential and substrate potential.

FIG. 3 is a graph showing an example of the substrate potential waveform and the power supply potential waveform in a circuit element. In FIG. 3, an alternate short and long dash line 11 is the substrate potential waveform, while a solid line 12 is the power supply potential waveform. It should be noted that since the power supply potential fluctuation and the substrate potential fluctuation have the same noise source, by simulating a circuit configuration in which a power supply impedance and a substrate impedance are connected as shown in FIG. 2, the waveforms can be simultaneously calculated.

A difference calculation step S103 reads the power supply potential waveform information 112 and the substrate potential waveform information 113, performs a difference calculation by using the power supply potential waveform and the substrate potential waveform for each circuit element, and obtains potential difference information 114 indicating a difference value between the power supply potential and the substrate potential.

At this point, as for the difference calculation methods, a variety of them may be considered. For example, out of differences between the power supply potential and the substrate potential at each time, the maximum value can be set as a difference value obtained here. Symbol 13 in FIG. 3 corresponds to the difference value in this case. The difference value to be obtained in this case is very close to a real potential difference. Further, there is a method of obtaining the difference value (e.g., maximum of the difference) on the basis of operating time information of the circuit elements, within the operating time range.

Further, for example, out of the difference between the maximum value of the power supply potential and the minimum value of the substrate potential and the difference value between the maximum value of the substrate potential and the minimum value of the power supply potential, a larger value may be set as the difference value here. Symbol 14 in FIG. 3 corresponds to the difference value of this case. In this case, the difference value obtained becomes a potential difference which assumes the worst condition.

Further, for example, a difference value between a mean of the power supply potential and a mean of the substrate potential may be set as the difference value here. In this case, the difference value obtained becomes a potential difference which lends itself easy to be evaluated when a time change of the potential does not affect circuit operation appreciably.

Next, from the obtained potential difference information 114, a circuit operation effect calculation step obtaining an effect to the circuit operation is performed. In the present embodiment, the circuit operation effect calculation step includes a potential determination step S107, a delay calculation step S105, and a timing analysis step S106.

The potential determination step S107 is a step of simply evaluating the potential difference information 114, by referring to a preset determination library 109. The determination library 109 stores, as difference restriction values, the upper limit value and the lower limit value in a range of the potential difference where no malfunction of the circuit will occur. These difference restriction values may be estimated by actual measurements or simulation by using a delay library 111 for substrate bias control. It is also possible to store a difference restriction value for each applied potential of the power supply (power supply potential in the case of no voltage drop) and applied potential of the substrate (substrate potential in the case of no voltage drop).

In the potential determination step S107, the difference value between the power supply potential and the substrate potential is read from the potential difference information 114, and whether this difference value exceeds the difference restriction value stored in the determination library 109 is determined. In the case of exceeding, it is determined that there could be malfunction due to the potential difference. If there could possibly be malfunction, NG, or if not, OK, is written in the determination result information 115.

Figure 4:
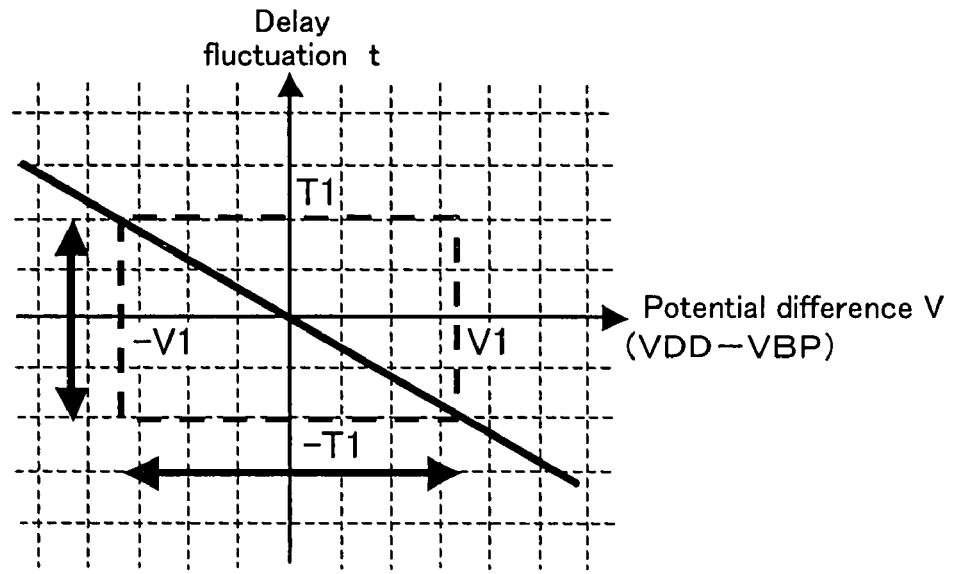
FIG. 4 is a graph showing a relationship between a difference between the power supply potential and the substrate potential, and delay fluctuation in a PMOS.

For example, if the acceptable range of delay fluctuation t is $-T1 \leq t \leq T1$ in the delay library 111 for substrate bias control in a PMOS transistor shown in FIG. 4, then the difference restriction values are determined as the upper limit value=V1 and the lower limit value=-V1. Likewise, if the acceptable range of delay fluctuation t is $-T2 \leq t \leq T2$ in the delay library 111 for substrate bias control in an NMOS transistor shown in FIG. 5, then the difference restriction values are determined as the upper limit value=V2 and the lower limit value=-V2. By using the determination library 109 having the difference restriction values, it is possible to determine whether the difference between the power supply potential and the substrate potential is within the acceptable range.

It should be noted that in the potential determination step S107, a fluctuation amount of a threshold may be obtained from the difference value shown in the potential difference information 114. In this case, all that is needed is to store information on the relationship between the difference value and the threshold fluctuation in the determination library 109.

Further, in the potential determination step S107, a jitter fluctuation amount may be obtained from the difference value shown in the potential difference information 114. In this case, all that is needed is to store information on the relationship between the difference value and the jitter fluctuation in the determination library 109.

Further, in the potential determination step S107, a fluctuation amount of accuracy of the analog/digital conversion circuit or digital/analog conversion circuit may be obtained from the difference value shown in the potential difference information 114. In this case, all that is needed is to store information on the relationship between the difference value and the accuracy fluctuation of the analog/digital conversion circuit or digital/analog conversion circuit in the determination library 109.

In the analog/digital conversion circuit, there is a discrete potential width of analog signal potential, which is to be input, in a comparator for digitalization. Depending on the potential difference between the power supply and the substrate, the analog signal potential shifts, so that in case of a-discrete, bit slippage occurs. The relationship of the potential difference between the power supply and the substrate with the bit slippage is expressed by a propagation function by impedance from the substrate potential to analog signal wiring. Consequently, it is possible to estimate beforehand effects on the analog/digital conversion circuit by storing this relationship as the determination library 109 and calculating effects on the analog signal potential from the potential difference.

By means of the potential determination step S107 described above, it is possible to determine the effects of the difference between the power supply potential and the substrate potential upon circuit operation.

Further, as a method of evaluating in detail the potential difference information 114, delay is obtained from the difference value shown by the potential difference information 114, whereby its appropriateness is judged. That is, the delay calculation step S105 obtains delay by using the difference value shown by the potential difference information 114 and by referring to the delay library 111 for substrate bias control, thereby generating delay information 116. The timing analysis step S106 performs a timing analysis of the circuit information 108 by using the delay information 116 and outputs timing violation information including a setup error and a hold error as a timing report 117.

Figure 6:
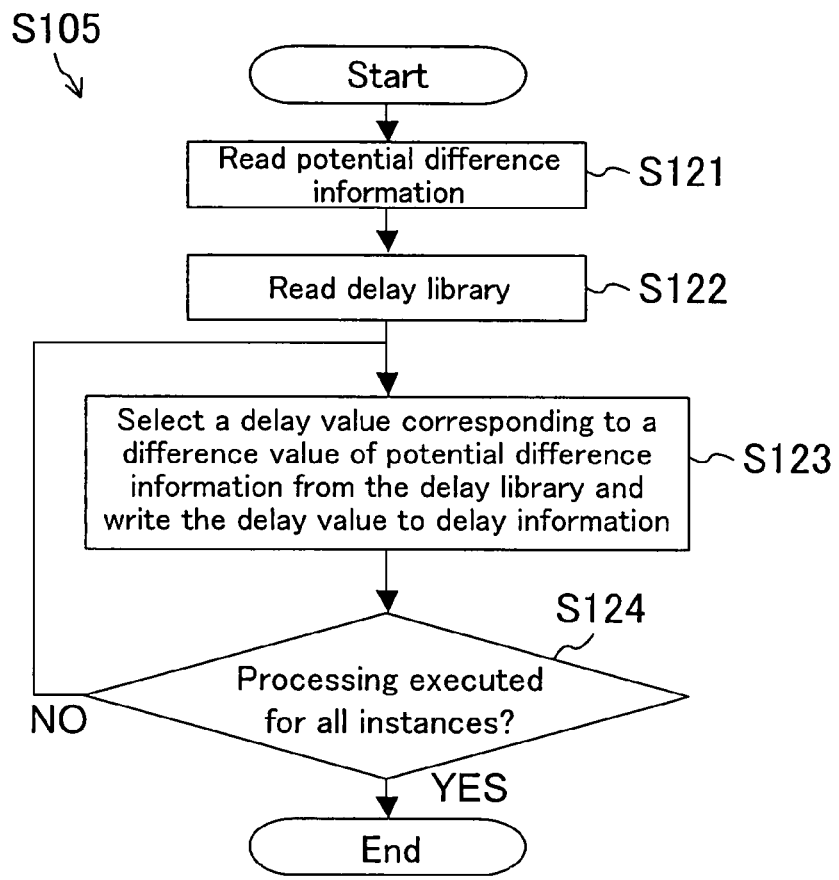
FIG. 6 is a flowchart indicating details of a delay analysis step in FIG. 1.

FIG. 6 is a flowchart showing the delay calculation step S105. As shown in FIG. 6, the delay calculation step S105 reads the difference value between the power supply potential and the substrate potential from the potential difference information 114 (step S121), reads the delay library 111 for substrate bias control (step S122), obtains a delay value for each circuit element from the delay library 111 for substrate bias control and stores the delay value in the delay information 116 (steps S123 and S124).

Figure 5:
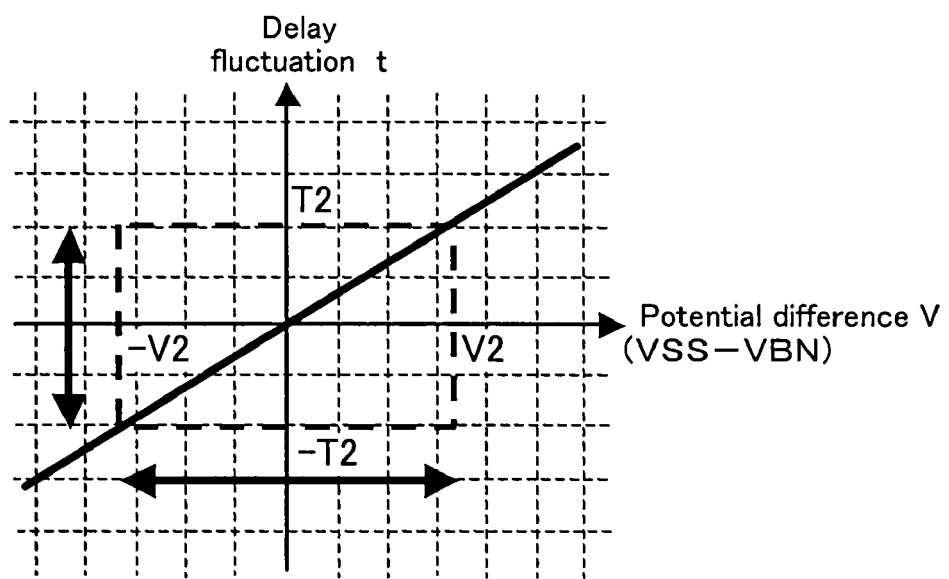
FIG. 5 is a graph showing a relationship between a difference between the power supply potential and the substrate potential, and delay fluctuation in an NMOS.

The delay library 111 for substrate bias control shows the relationship of the difference value between the power supply potential and the substrate potential with delay. Specifically, this is stored in form of a function indicating the relationship between the potential difference and the delay fluctuation rate as shown in FIG. 4 and FIG. 5 and the delay fluctuation rate per discrete point of the potential difference. It should be noted that when looking at the effects on the analog circuit, a library showing a relationship between the potential difference and a degree of effects on the analog circuit is used. In case of a PLL circuit, a library showing a relationship between the potential difference and the quantity of phase slippage is used. These libraries, like the delay library 111 for substrate bias control, are stored in the form of the function indicating the relationship between the potential difference and the delay fluctuation rate and the delay fluctuation rate per discrete point of the potential difference.

One example of such information is shown in FIG. 4. In this example, the delay fluctuation in regard to the difference value between the power supply potential and the substrate potential is in the form of a function $t=(-T1/V1) \times \Delta V$. Note that a form having discrete value information may also be used.

Further, these values may be stored in relation to applied potential of the power supply, applied potential of the substrate, or their difference. This enables an accurate estimate of delay to be made. When the relationship between the potential difference and the delay fluctuation and the like is stored in the form of a function, inputting the potential difference into the stored function will yield desired information on the delay fluctuation and the like. Still further, when the relationship between the potential difference and the delay fluctuation and the like is stored in the form of discrete value information, it is possible to obtain desired information on the delay fluctuation and the like by using weighted average. For example, if the delay fluctuation relating to potential difference Va is given as Ta and the delay fluctuation relating to potential difference Vb is given as Tb, then the delay fluctuation T at potential difference V meeting Va<V<Vb can be obtained by $T=T1 \times (Vb-V)/(Vb-Va)+T2 \times (V-Va)/(Vb-Va)$.

FIG. 4 and FIG. 5 are graphs having the difference values of voltage on the horizontal axis and a rising delay value or a falling delay value on the vertical axis. The delay library has the relationship between this voltage difference values and the rising delay value or the falling delay value in the form of a table or a function. That is, the potential difference between the power supply potential and the substrate potential is obtained, and then the potential difference can be converted to the delay fluctuation by using the delay library.

Specifically, the step is as follows. If the potential difference between the power supply potential VDD and the substrate potential VBP is $\Delta V$, it can be converted to the delay fluctuation as follows by using the delay library in FIG. 4.

Delay fluctuation=$(-V1/T1) \times \Delta V$

The timing analysis step S106 analyzes delay in the circuit information 108 by using well-known methods such as a static timing analysis method and a dynamic timing analysis method, predicts malfunction of the circuit, and outputs timing violation information such as the setup error and the hold error to the timing report 117.

Figure 7:
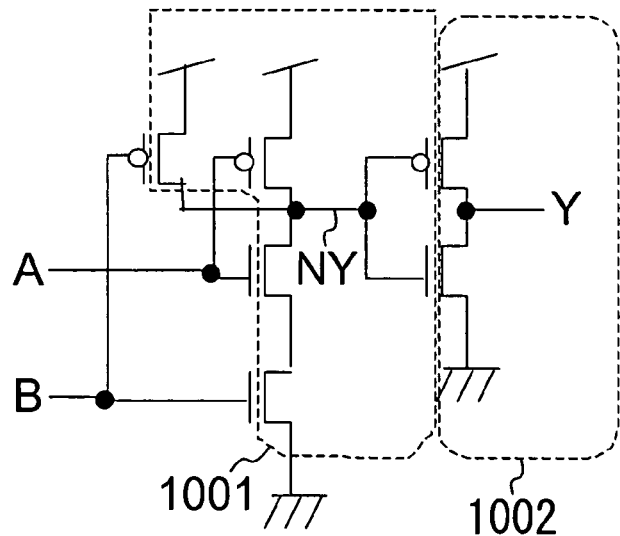
FIG. 7 is a diagram showing an example of circuit elements.

Further, in a cell macro delay characterizing step S104, in view of the N well substrate potential affecting the rising delay due to the P-channel transistor and the P well substrate potential affecting the falling delay due to the N-channel transistor, effects of the N well substrate potential and the P well substrate potential upon delay are obtained in advance as coefficients. As shown in FIG. 7, individual cells are divided into circuit elements 1001 and 1002 connected via channels. Then, as shown in FIG. 8, depending on the logic state at the rising and the falling of each circuit element in the cell input status, the delay with no potential difference is multiplied by the coefficient. This can facilitate obtaining the delay library 111 for substrate bias control.

Figure 9:
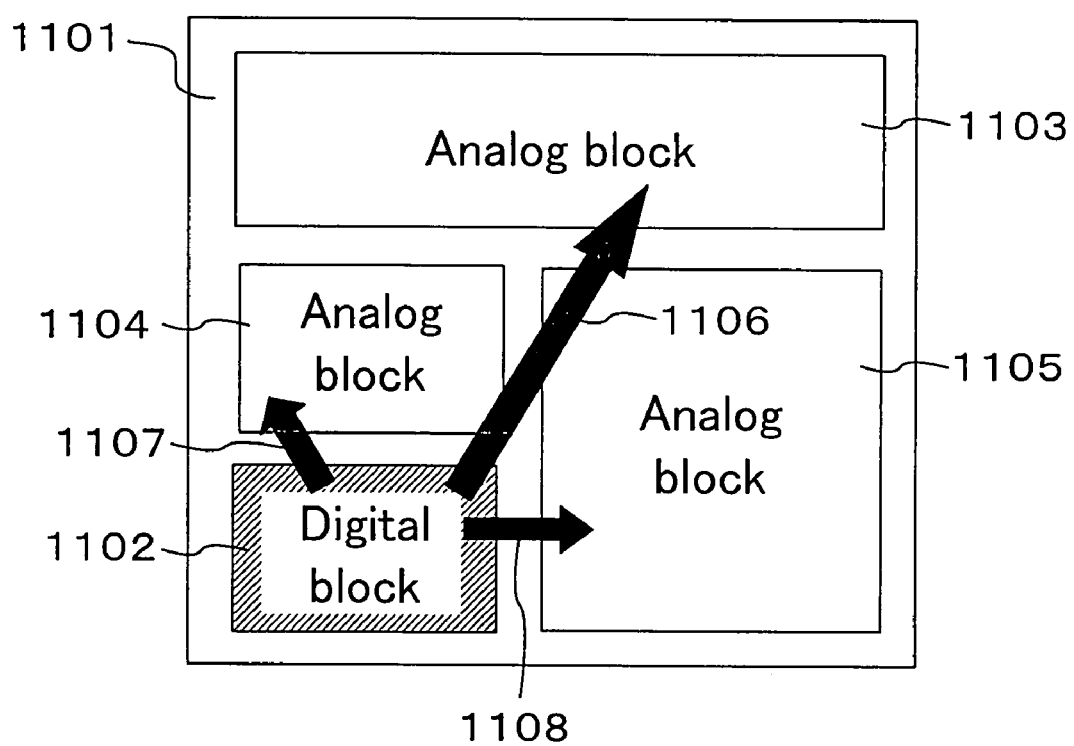
FIG. 9 is a diagram showing substrate noise propagation to analog blocks.

Further, by using the foregoing potential difference information 114, delay library 111 for substrate bias control, and determination library 109, in the LSI chip 1101 shown in FIG. 9, it is possible to evaluate the effects of noise 1106, 1107, or 1108, which is generated by a digital block 1102, propagating through the substrate upon the analog blocks 1103, 1104, or 1105. This makes it possible to evaluate the extent of effects of substrate noise upon the accuracy at the time of analog/digital conversion or digital/analog conversion as well as whether such effects are within the acceptable range.

Figure 10:
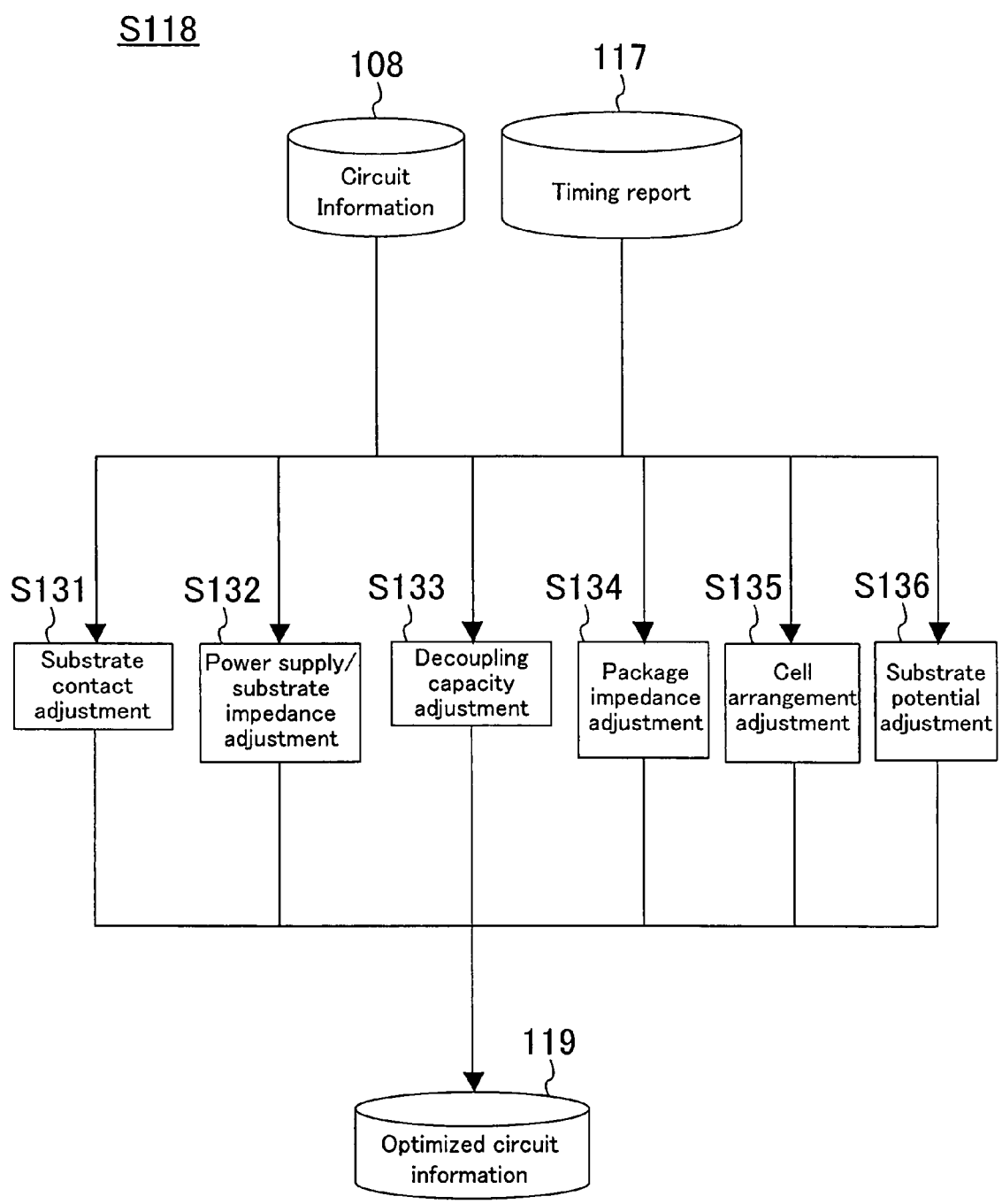
FIG. 10 is a diagram showing an example of an optimization step in FIG. 1.

Further, so as to reduce noise, the optimization step S118 shown in FIG. 1 modifies the circuit information 108 from the results of calculation in the circuit operation effect calculation step, for example, from the determination result information 115 and the timing report 117. Specifically, as shown in FIG. 10, such information has at least one of: a substrate contact adjustment step S131 of adjusting the number and intervals of substrate contacts; a power supply/substrate impedance adjustment step S132 of adjusting wiring widths of the power supply wiring and the substrate wiring, together with mesh wiring intervals; a decoupling capacity adjustment step S133 of adjusting the number and amounts of decoupling capacities among the power supply wiring, the ground wiring, and the substrate wiring; a package impedance adjustment step S134 of adjusting the package type, wire length, and capacity value; a cell arrangement adjustment step S135 of adjusting an arrangement of cells having a high rate of activation which affects noise; and a substrate potential adjustment step S136 of adjusting the substrate potential and the amount of current running into the substrate. Moreover, the optimized circuit is outputted to optimized circuit information 119.

The cell arrangement adjustment step S135 can take such a form of arrangement as to place a cell with heavy power consumption in the vicinity of a contact, a cell with a large frequency of using a toggle switch in the vicinity of a substrate contact, and flip-flop/clock buffer/bus wiring in the vicinity of a contact that performs substrate bias controlling.

As described above, according to the present embodiment, it is possible to obtain potential difference information on the power supply potential and the substrate potential in the semiconductor integrated device, so that by using the potential difference information and the prepared delay library, it is possible to determine whether the substrate noise is within the acceptable range and to analyze effects of the substrate noise upon circuit delay.

Figure 11:
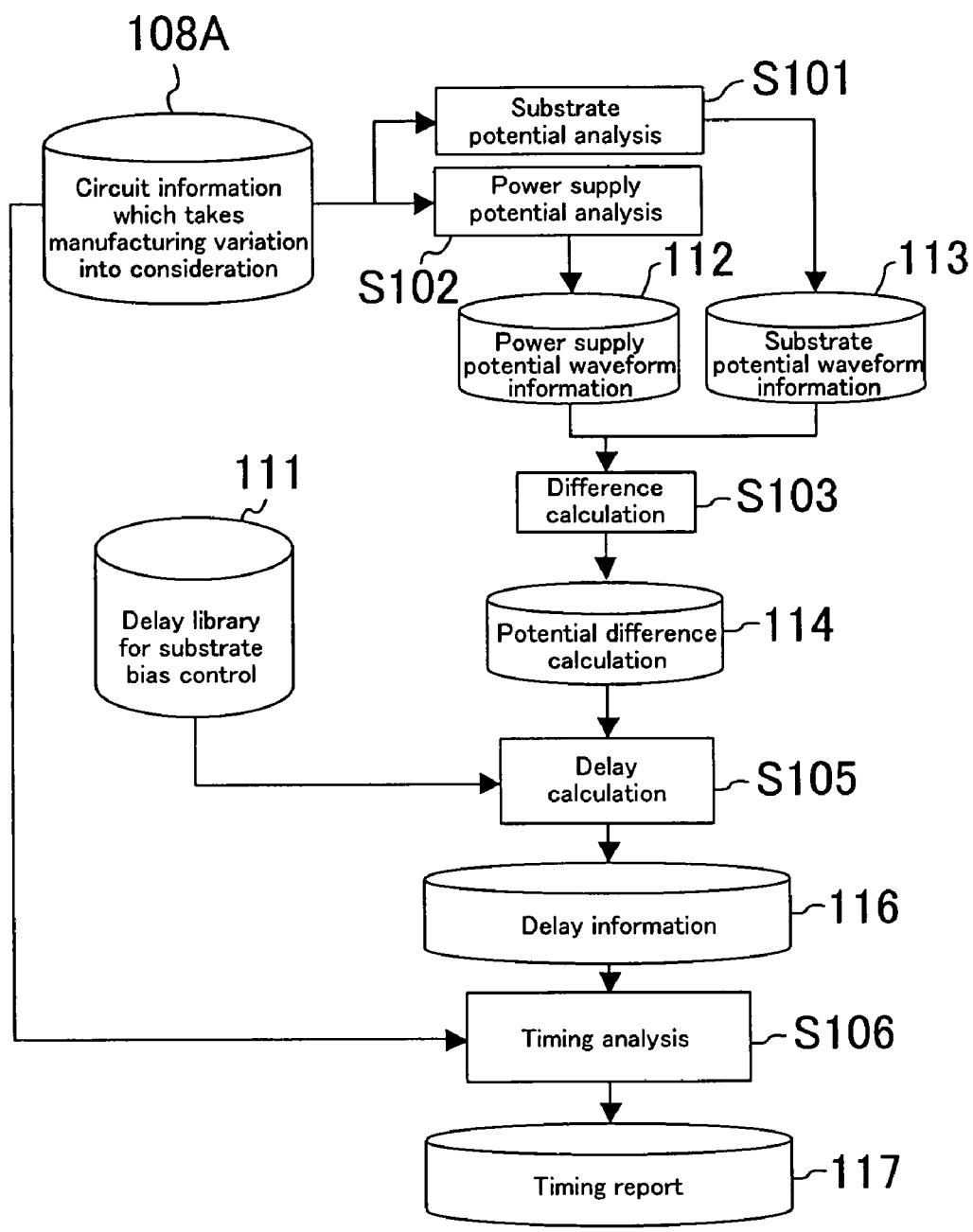
FIG. 11 is a diagram showing an operation analysis method of the semiconductor integrated circuit according to another embodiment of the present invention.

FIG. 11 is a diagram showing an operation analysis method of the semiconductor integrated circuit according to another embodiment of the present invention. In FIG. 11, elements and steps in common with FIG. 1 carry the same reference characters and numerals as in FIG. 1 and detailed explanation thereof will be omitted herein.

According to the method in FIG. 11, instead of the circuit information 108, circuit information 108A that takes manufacturing variation into consideration is used in the substrate potential analysis step S101 and the power supply potential analysis step S102. This makes it possible to obtain information closer to reality.

Figure 12:
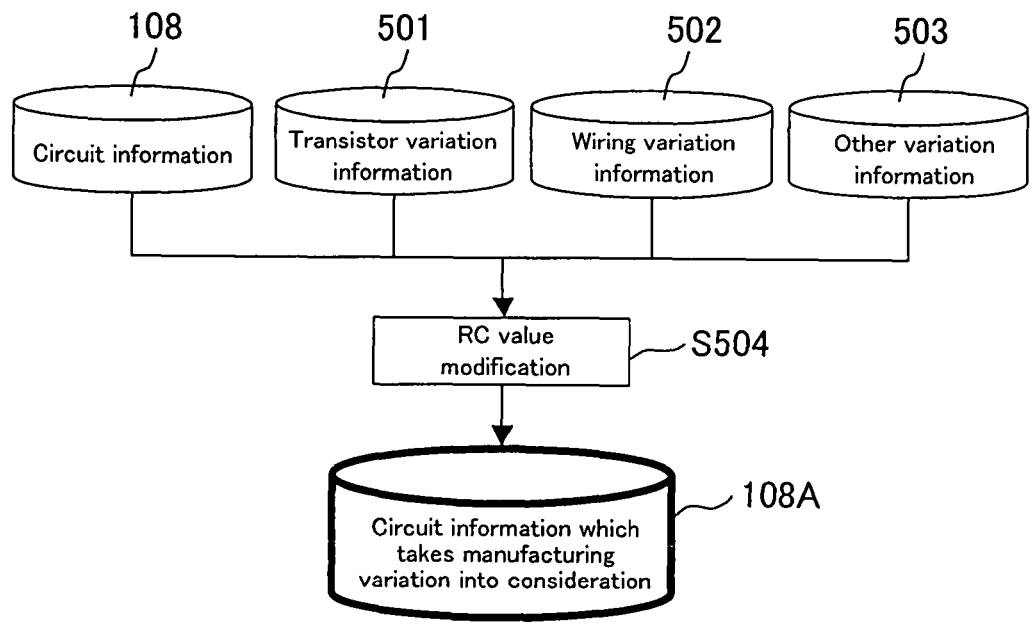
FIG. 12 is a diagram showing a method of generating circuit information which takes manufacturing variation into consideration.

FIG. 12 is a diagram showing a method of generating the circuit information 108A, which takes manufacturing variation into consideration, from the circuit information 108. As shown in FIG. 12, in an RC value modification step S504 as a modification step, modification is performed in consideration of the manufacturing variation with regard to at least one of the resistance value and the capacity value in the circuit information 108 by using transistor variation information 501, wiring variation information 502, and other variation information 503 as manufacturing variation information. At this point, the more information volume of the manufacturing variation becomes, the more proper the circuit information 108 is modified.

Figure 13:
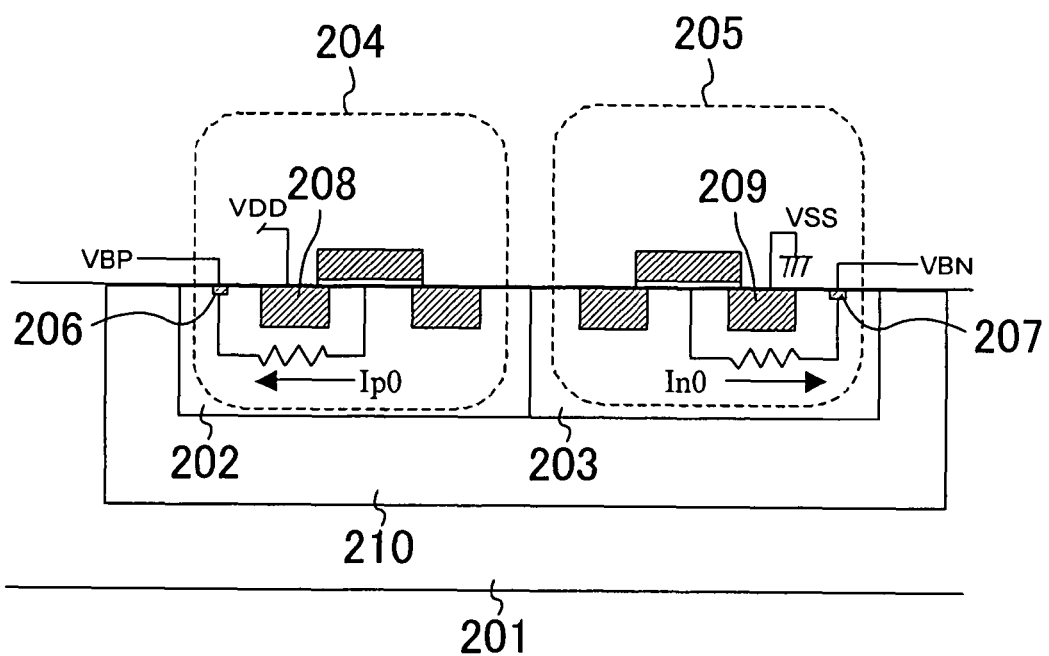
FIG. 13 is a diagram showing a substrate leak current of a MOS transistor.

How to estimate the transistor variation information 501 will be described. An example is a method whereby a chip for testing is designed and fabricated and a degree of variation of leak current to the substrate at each position inside the chip is evaluated, while this is expressed in a coefficient and the like. To simply perform evaluation of in-chip positional dependency of the degree of variation, it is preferable that a plurality of identical small-scale circuits are mounted in the testing chip. First, attention is focused on any transistor in the chip, leak current to the substrate in that transistor is measured, and the measurement is set as the reference value. Specifically, as shown in FIG. 13, as for the P-channel transistor 204, its substrate current Ip0 is measured, while as for the N-channel transistor 205 its substrate current In0 is measured, with each measurement being used as the reference value of the leak current at each channel transistor. Next, the leak current to the substrate of the transistor at each position inside the chip is measured with the same method as when measuring the reference value, and a ratio of increase and decrease with respect to the reference value is calculated as the coefficient.

Figure 14:
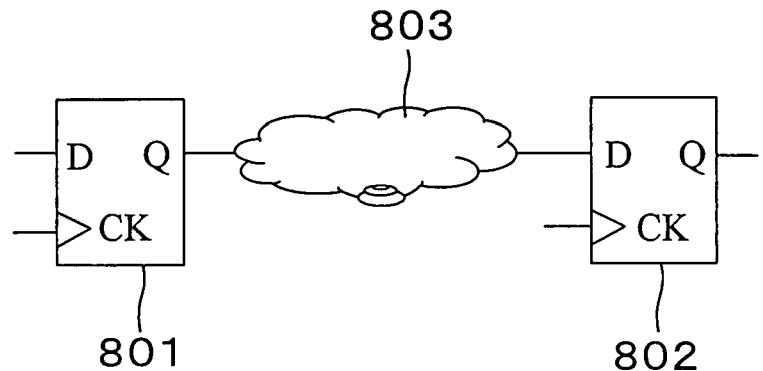
FIG. 14 is a diagram showing an example of a chip internal data path.

Next, how to estimate the wiring variation information 502 will be described. An example is a method whereby a chip for testing is designed and fabricated and a degree of variation of the signal delay value at each position inside the chip is evaluated, while this is expressed in a coefficient and the like. To simply perform evaluation of in-chip positional dependency of the degree of variation, it is preferable that a plurality of identical small-scale circuits are mounted in the testing chip. First, attention is focused on any data path in the chip, a delay value at that data path is measured, and the measurement is set as the reference value. Specifically, as shown in FIG. 14, as for a data path between a flip-flop 801 and a flip-flop 802, a delay time for a data signal to reach from a data output pin Q of the flip-flop 801 to a data input pin D of the flip-flop 802 is measured, with the measurement being used as the reference value of the signal delay. Next, the delay time of the data path between flip-flops at each position inside the chip is measured with the same method as when measuring the reference value, and a ratio of increase and decrease with respect to the reference value is calculated as the coefficient.

It should be noted that since the effects of the manufacturing variation may vary depending on process generations, it is necessary to perform evaluation per process generation.

Consideration of the effects of the manufacturing variation is performed in the RC value modification step S504. Resistance values and capacity values used as models to express transistors, a parasitic resistance value, a parasitic capacity value of each wiring and the like are subject to the modification. Effects due to the manufacturing variation are expressed by coefficients and the like, and modification is made by multiplying the resistance values and the capacity values, which serve as the subjects, by such coefficients. Note that the modification here be performed for the resistance value alone or the capacity value alone.

The substrate potential analysis step S101 performs analysis of the substrate potential by using the circuit information 108A, which takes the manufacturing variation into consideration, obtains the substrate potential waveform at each circuit element, and outputs it as the substrate potential information 113. The power supply potential analysis step S102 performs analysis of the power supply potential by using the circuit information 108A, which takes the manufacturing variation into consideration, obtains the power supply potential waveform at each circuit element, and outputs it as the power supply potential information 112.

The difference calculation step S103 reads the power supply potential waveform information S104 and the substrate potential waveform information S105, performs difference calculation of each circuit element by using the power supply potential waveform and the substrate potential waveform, and obtains the potential difference information 114 indicating the difference value between the power supply potential and the substrate potential. In this embodiment, for each region in the semiconductor integrated circuit, potential difference information per circuit element belonging to the region is obtained, and out of the potential difference information obtained, the information having the maximum absolute value will be set as the potential difference information for the region.

Figure 15:
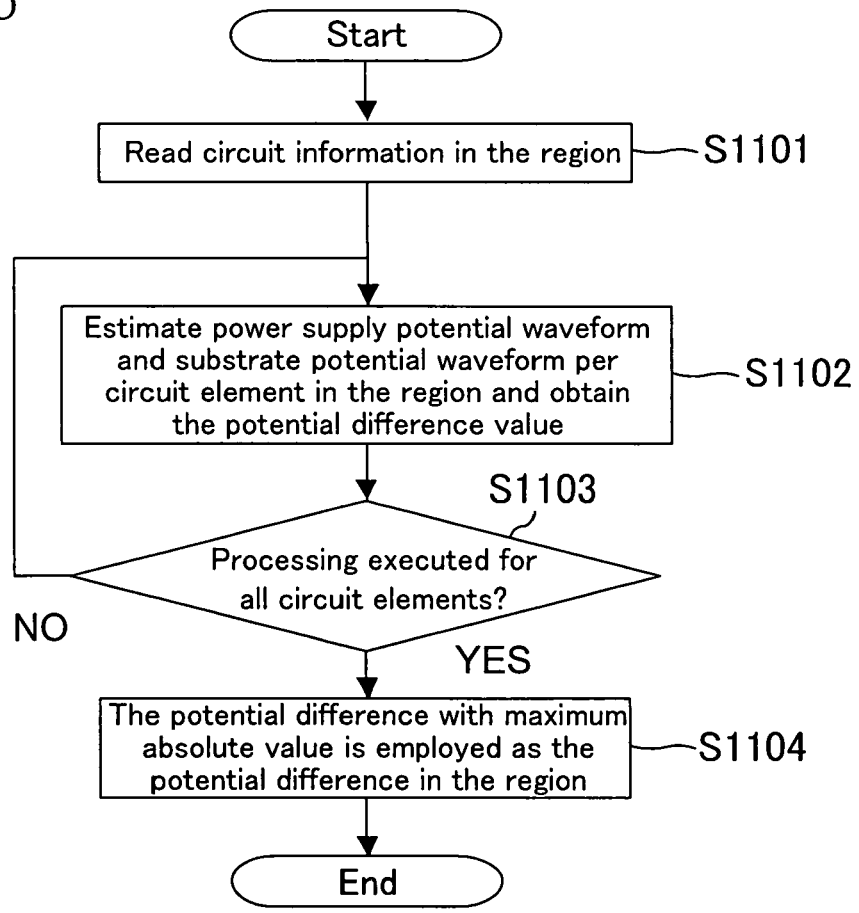
FIG. 15 is a flow to obtain potential difference information in each region in the semiconductor integrated circuit.
Figure 16:
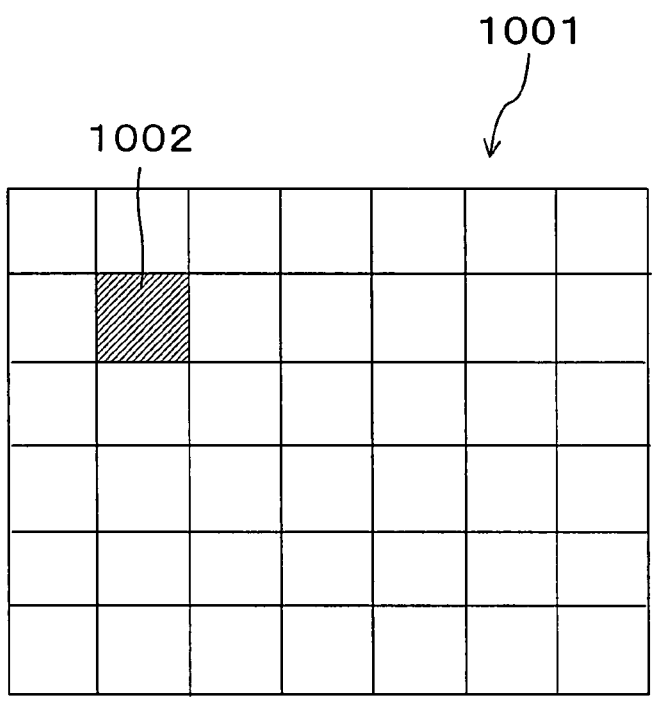
FIG. 16 is a diagram showing an example of a unit area which takes variation inside a chip into consideration.

FIG. 15 shows a flow to obtain potential difference information at each region in the semiconductor integrated circuit. When the manufacturing variation is taken into consideration, it is necessary to obtain potential difference information per small region such as a region 1002 in a chip 1001 shown in FIG. 16. Further, as the potential difference information at each region, the most pessimistic information in terms of timing analysis inside the region needs to be employed. For example, it is required to employ potential difference information that may make the data signal delay value slow at the time of detecting a setup error and information that may make data signal delay value fast at the time of detecting a hold error.

That is, the circuit information in the region is read (S1101), the power supply potential waveform and the reference potential waveform are estimated in regard to all circuit elements in the region, and the potential difference value is obtained (S1102 and S1103). That which has the maximum absolute value of potential difference is employed as the potential difference information for the region (S104).

The delay calculation step S105 obtains delay by using the difference value indicated by the potential difference information 114 and by referring to the delay library 111 for substrate bias control, and generates the delay information 116. In this embodiment, the delay value distribution information in the semiconductor integrated circuit is to be obtained from the potential difference information per region, which is obtained in the difference calculation step S103.

Figure 17:
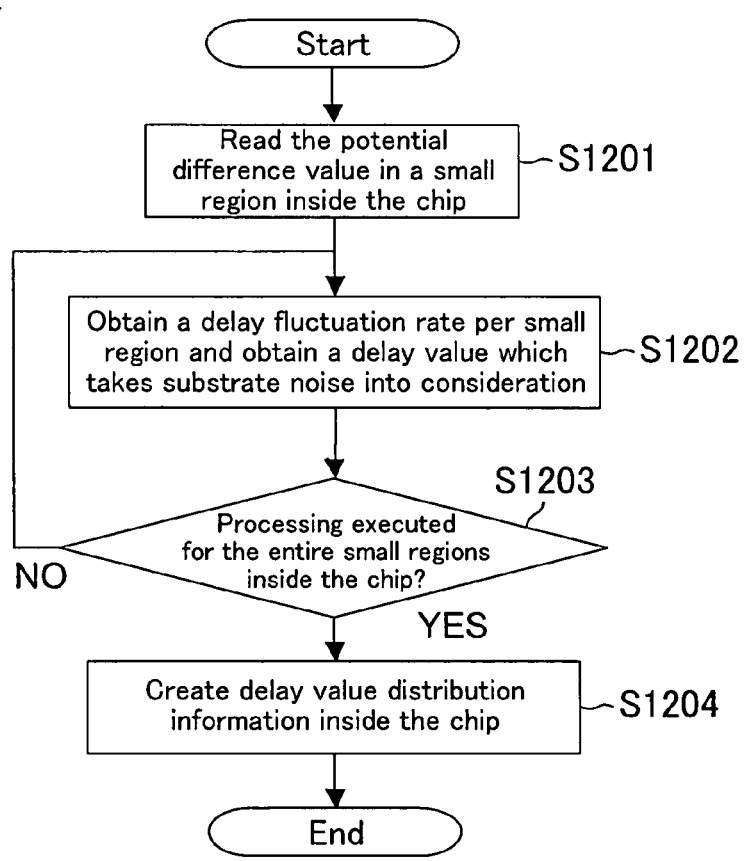
FIG. 17 is a flow to obtain delay value distribution information in the semiconductor integrated circuit.
Figure 18:
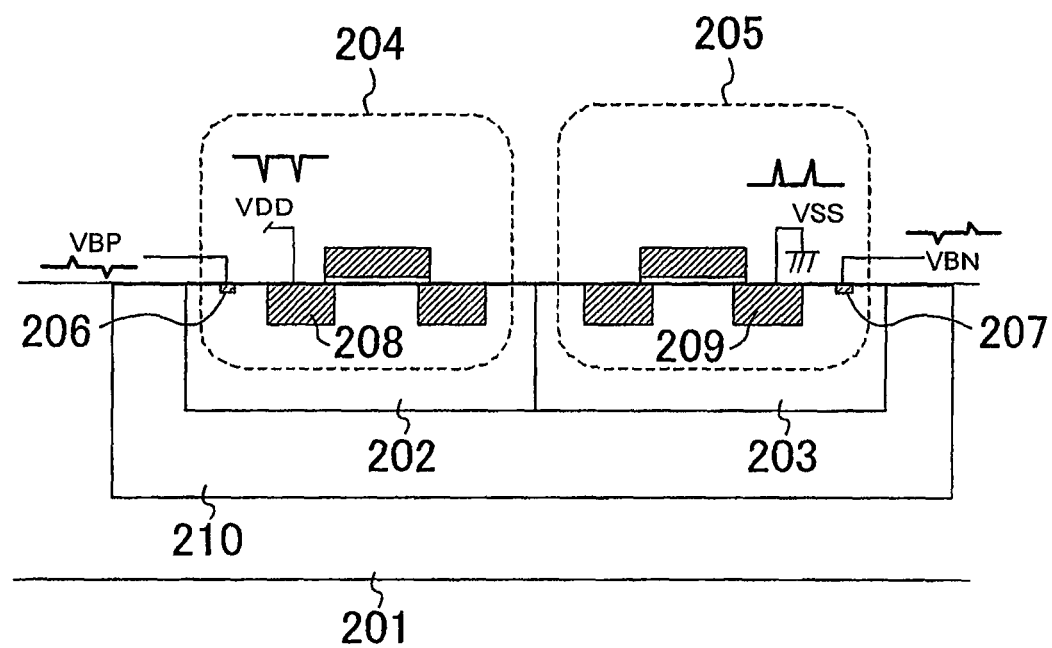
FIG. 18 is a diagram showing a configuration of a MOS transistor in the substrate bias control design.

FIG. 17 presents a flow to obtain the delay value distribution information in the semiconductor integrated circuit. That is, the potential difference value in the small region in the chip is read (S1201), the delay fluctuation rate is obtained for all small regions, and the delay value that takes the substrate noise into consideration is obtained (S1202 and S1203). From the delay value obtained in regard to each small region, the delay value distribution information inside the chip is created (S1204).

The timing analysis step S111 analyzes delay in the circuit information 108A, which takes the manufacturing variation into consideration, predicts circuit malfunction, and outputs to the timing report 117 the timing violation information such as a setup error and a hold error. At this point, use of the delay information 116 created in the foregoing manner enables proper timing analysis to be made at each position in the chip, thus allowing for a design without excessive margin.

As mentioned above, according to this embodiment, the potential difference information of the power supply potential and the substrate potential when the manufacturing variation in the semiconductor integrated circuit is taken into consideration can be obtained, thereby making it possible to analyze more properly the effects of substrate noise upon circuit delay by using such potential difference information and the delay library.

The operation analysis method of the semiconductor integrated circuit according to the present invention is useful as a method of performing malfunction prediction particularly at the LSI design stage using the substrate bias control technology.

The invention claimed is:

1. A method of performing an operation analysis for a semiconductor integrated circuit designed by using substrate bias control technology, the method comprising:
    a power supply potential analysis step of analyzing a power supply potential by using circuit information of the semiconductor integrated circuit and obtaining a power supply potential waveform of each circuit element;
    a substrate potential analysis step of analyzing a substrate potential by using the circuit information and obtaining a substrate potential waveform of each circuit element; and
    a difference calculation step of performing a difference calculation for each circuit element by using the power supply potential waveform and the substrate potential waveform and obtaining potential difference information indicating a difference value between the power supply potential and the substrate potential, wherein:
    the operation analysis of the semiconductor integrated circuit is performed by using the potential difference information, and
    in the difference calculation step, a maximum value of differences between the power supply potential and the substrate potential at each time is set as the difference value.

2. The method according to claim 1, further comprising a circuit operation effect calculation step of obtaining effects on circuit operation from the potential difference information.

3. The method according to claim 2, wherein the circuit operation effect calculation step further comprises a step of determining whether the difference value indicated by the potential difference information exceeds a predetermined difference restriction value.

4. The method according to claim 2, wherein the circuit operation effect calculation step comprises a step of obtaining a fluctuation amount of a threshold from the difference value indicated by the potential difference information.

5. The method according to claim 2, wherein the circuit operation effect calculation step comprises a step of obtaining a fluctuation amount of jitter from the difference value indicated by the potential difference information.

6. The method according to claim 2, wherein the circuit operation effect calculation step comprises a step of obtaining a fluctuation amount of accuracy of an analog/digital conversion circuit or a digital/analog conversion circuit from the difference value indicated by the potential difference information.

7. The method according to claim 2, wherein the circuit operation effect calculation step comprises a step of obtaining a delay by using the difference value indicated by the potential difference information and by referring to a delay library showing a relationship between the differential value and the delay.

8. The method according to claim 7, wherein the delay library has information on a relationship between the difference value, and a rising delay value, and a falling delay value.

9. The method according to claim 2, further comprising an optimization step of modifying the circuit information from calculation results of the circuit operation effect calculation step so as to reduce noise.

10. The method according to claim 9, wherein the optimization step has at least one selected from the group consisting of:
    a step of adjusting a number and intervals of substrate contacts;
    a step of adjusting wiring widths of power supply wiring and substrate wiring, together with adjusting mesh wiring intervals;
    a step of adjusting a number and quantities of decoupling capacities among the power supply wiring, ground wiring, and the substrate wiring;

a step of adjusting kinds of packages, lengths of wires, and values of capacities;

a step of adjusting an arrangement of cells having high activation rates which affect noise; and a step of adjusting the substrate potential and an amount of current to be put into the substrate.

11. A method of performing an operation analysis for a semiconductor integrated circuit designed by using substrate bias control technology, the method comprising:

a power supply potential analysis step of analyzing a power supply potential by using circuit information of the semiconductor integrated circuit and obtaining a power supply potential waveform of each circuit element;

a substrate potential analysis step of analyzing a substrate potential by using the circuit information and obtaining a substrate potential waveform of each circuit element; and a difference calculation step of performing a difference calculation for each circuit element by using the power supply potential waveform and the substrate potential waveform and obtaining potential difference information indicating a difference value between the power supply potential and the substrate potential, wherein:

the operation analysis of the semiconductor integrated circuit is performed by using the potential difference information, and in the difference calculation step, a larger value of a difference between a maximum value of the power supply potential and a minimum value of the substrate potential, and a difference between a maximum value of the substrate potential and a minimum value of the power supply potential, is set as the difference value.

12. The method according to claim 11, further comprising a circuit operation effect calculation step of obtaining effects on circuit operation from the potential difference information.

13. The method according to claim 12, wherein the circuit operation effect calculation step further comprises a step of determining whether the difference value indicated by the potential difference information exceeds a predetermined difference restriction value.

14. The method according to claim 12, wherein the circuit operation effect calculation step comprises a step of obtaining a fluctuation amount of a threshold from the difference value indicated by the potential difference information.

15. The method according to claim 12, wherein the circuit operation effect calculation step comprises a step of obtaining a fluctuation amount of jitter from the difference value indicated by the potential difference information.

16. The method according to claim 12, wherein the circuit operation effect calculation step comprises a step of obtaining a fluctuation amount of accuracy of an analog/digital conversion circuit or a digital/analog conversion circuit from the difference value indicated by the potential difference information.

17. The method according to claim 12, wherein the circuit operation effect calculation step comprises a step of obtaining a delay by using the difference value indicated by the potential difference information and by referring to a delay library showing a relationship between the differential value and the delay.

18. The method according to claim 17, wherein the delay library has information on a relationship between the difference value, and a rising delay value, and a falling delay value.

19. The method according to claim 12, further comprising an optimization step of modifying the circuit information from calculation results of the circuit operation effect calculation step so as to reduce noise.

20. The method according to claim 19, wherein the optimization step has at least one selected from the group consisting of:

a step of adjusting a number and intervals of substrate contacts;

a step of adjusting wiring widths of power supply wiring and substrate wiring, together with adjusting mesh wiring intervals;

a step of adjusting a number and quantities of decoupling capacities among the power supply wiring, ground wiring, and the substrate wiring;

a step of adjusting kinds of packages, lengths of wires, and values of capacities;

a step of adjusting an arrangement of cells having high activation rates which affect noise; and a step of adjusting the substrate potential and an amount of current to be put into the substrate.

21. A method of performing an operation analysis for a semiconductor integrated circuit designed by using substrate bias control technology, the method comprising:

a power supply potential analysis step of analyzing a power supply potential by using circuit information of the semiconductor integrated circuit and obtaining a power supply potential waveform of each circuit element;

a substrate potential analysis step of analyzing a substrate potential by using the circuit information and obtaining a substrate potential waveform of each circuit element; and a difference calculation step of performing a difference calculation for each circuit element by using the power supply potential waveform and the substrate potential waveform and obtaining potential difference information indicating a difference value between the power supply potential and the substrate potential, wherein:

the operation analysis of the semiconductor integrated circuit is performed by using the potential difference information, and wherein in the difference calculation step, a difference value between a mean value of the power supply potential and a mean value of the substrate potential is set as the difference value.

22. The method according to claim 21, further comprising a circuit operation effect calculation step of obtaining effects on circuit operation from the potential difference information.

23. The method according to claim 22, wherein the circuit operation effect calculation step further comprises a step of determining whether the difference value indicated by the potential difference information exceeds a predetermined difference restriction value.

24. The method according to claim 22, wherein the circuit operation effect calculation step comprises a step of obtaining a fluctuation amount of a threshold from the difference value indicated by the potential difference information.

25. The method according to claim 22, wherein the circuit operation effect calculation step comprises a step of obtaining a fluctuation amount of jitter from the difference value indicated by the potential difference information.

26. The method according to claim 22, wherein the circuit operation effect calculation step comprises a step of obtaining a fluctuation amount of accuracy of an analog/digital conversion circuit or a digital/analog conversion circuit from the difference value indicated by the potential difference information.

27. The method according to claim 22, wherein the circuit operation effect calculation step comprises a step of obtaining a delay by using the difference value indicated by the potential difference information and by referring to a delay library showing a relationship between the differential value and the delay.

28. The method according to claim 27, wherein the delay library has information on a relationship between the difference value, and a rising delay value, and a falling delay value.

29. The method according to claim 22, further comprising an optimization step of modifying the circuit information from calculation results of the circuit operation effect calculation step so as to reduce noise.

30. The method according to claim 29, wherein the optimization step has at least one selected from the group consisting of:

a step of adjusting a number and intervals of substrate contacts;

a step of adjusting wiring widths of power supply wiring and substrate wiring, together with adjusting mesh wiring intervals;

a step of adjusting a number and quantities of decoupling capacities among the power supply wiring, ground wiring, and the substrate wiring;

a step of adjusting kinds of packages, lengths of wires, and values of capacities;

a step of adjusting an arrangement of cells having high activation rates which affect noise; and a step of adjusting the substrate potential and an amount of current to be put into the substrate.

* * * * *